(No Model.)
H. W. BRINCKERHOFF.
EXPANSIBLE JOINT FOR PIPES.
No. 381,825. Patented Apr. 24, 1888.
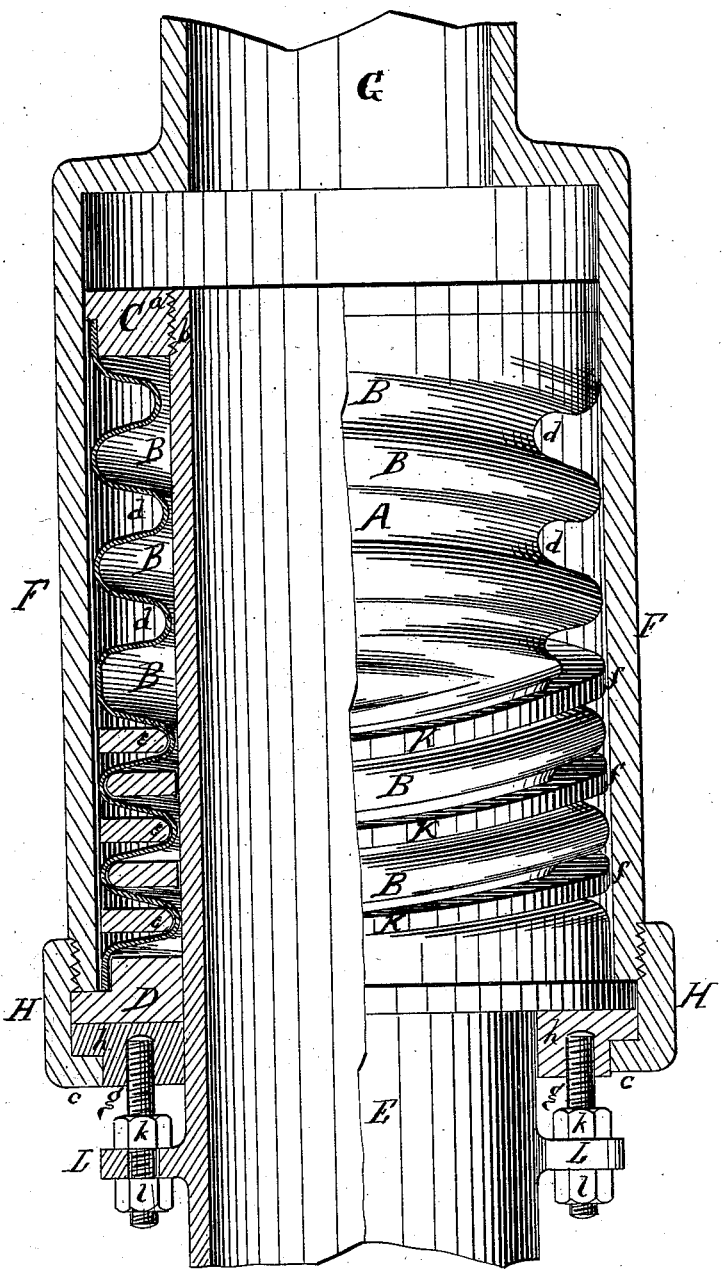
WITNESSES:
Chas. Nida.
Jno. A. Bruno.
INVENTOR,
Henry W. Brinckerhoff.
BY [signature]
ATTORNEY

UNITED STATES PATENT OFFICE.

HENRY W. BRINCKERHOFF, OF BROOKLYN, NEW YORK.

EXPANSIBLE JOINT FOR PIPES.

SPECIFICATION forming part of Letters Patent No. 381,825, dated April 24, 1888.

Application filed March 3, 1883. Renewed January 26, 1885. Serial No. 154,050. (No model.)

*To all whom it may concern:*

Be it known that I, HENRY W. BRINCKERHOFF, of the city of Brooklyn, county of Kings, and State of New York, have invented a new and useful Improvement in Expansible Joints or Connections for Pipes or Tubes; and I do hereby declare the following to be a full, clear, and exact description of the same, reference being had to the accompanying sheet of drawings, forming part of this specification.

This invention has for its object an improvement in expansible joints or connections for pipes and tubes; and the invention consists in an expansible pipe joint or connection constructed and arranged substantially as herein particularly set forth and claimed.

In the accompanying sheet of drawings the figure represents a view of my device, partly in section.

Similar letters of reference indicate like parts.

The difficulty of making steam-pipe connections between sections of pipes where they are jointed together, so that due allowance can be made for the expansion and contraction of the metal of the pipes, due to a difference in or varying temperature, is too well known to need further remark beyond stating that such connections are commonly made by the ordinary "slip-joint"—that is, a packing between the connecting-pipes which will permit the pipes to expand and contract without leaking the steam which is conveyed through them; but many objections are found to arise from the use of this slip-joint, such as the necessity of constant tightening. This tightening renders such a joint practically unserviceable when the pipes are buried underground, or placed in position where they are not readily accessible. Besides, the packing of slip-joints under such circumstances will be apt to decay, resulting in leakage and loss of steam. Therefore, to produce an expansible joint, to connect sections of pipe together that will not require attention when once in place, that will not decay, and will under all circumstances be tight and render the loss of steam passing through the pipes impossible, I construct a sleeve or section, A, from any thin suitable metal, preferably a metal that is ductile and tenacious—as, for instance, copper. This sleeve may be of any required length or diameter, and it is made with a series of corrugations, B, around the sleeve, either annular or spiral. If spiral, the corrugations may have a uniform pitch from one end of the sleeve to the other; or they may have a uniform pitch in one direction up to a point, say, midway from the ends of the sleeve, and the corrugations be continued from that point with an opposite pitch, as shown in the figure. The sleeve in this way constructed has one of its ends brazed to a ring, C, which ring has screw-threads $a$ formed around its inner surface, and the other end of the sleeve is brazed to a ring, D, made, however, without the screw-threads $a$, before mentioned.

The sleeve A, with its rings C and D, being now placed over that end of the pipe E which is to be received within its connecting-pipe, the ring C is screwed onto this pipe by screw-threads $b$, corresponding with the screw-threads $a$ in ring C. Now, in making the connection between the ends of two pipes, the pipe E, with its corrugated sleeve A and ring C, is inserted within the enlarged mouth F of the pipe G. The ring D being somewhat larger in diameter than the interior diameter of this mouth, it abuts against the edge of the open end of said mouth. Surrounding the end of the mouth F is next screwed a ring, H, with a projecting flange or lip, $c$, which is brought tightly in contact with the outer surface of the ring D, or an intermediate ring, $h$, as shown in the drawing, confining this ring D in its position against the edge of the mouth F.

From the foregoing description it will be seen that one end of the corrugated sleeve A is fixed to or near the end of the entering pipe E, and the other end of this sleeve is, to all intents and purposes, fixed to or near the end of the inclosing-pipe G, by which construction and arrangement, as the entering pipe E expands and contracts, or the inclosing or outer pipe contracts or expands, the sleeve A is drawn from each of its ends equally, causing the several corrugations of the sleeve to be uniformly drawn out or contracted; or, in other words, they will be subjected to a uniform tension, each of them bearing its proportionate share of the strain.

The corrugations are better able to stand a tensile than a compressive force, for the reason that when compressed the corrugations are deepened, and therefore less able to resist the compressive force. In the former case the weaker corrugations speedily reach their maximum resistance, and the other corrugations are compelled in turn to do their share of the work, and in the latter case the weaker corrugations are likely to be entirely crippled before the other corrugations are materially strained. By having the corrugations on the sleeve at opposite pitches up to a point midway between the ends of the sleeve before described, when the pipes expand or contract, the tension on the sleeve or its corrugations, when in this way formed, will tend to cause that part of the sleeve between the reversed inclinations of the corrugations to turn somewhat around the pipe which it incloses, and therefore yield by this turning, notwithstanding the ends of the sleeve are confined to the entering and inclosing pipes, as stated.

Now, to re-enforce the sleeve A, it being made, as before stated, of thin sheet metal, and to protect it from any external pressure from steam or otherwise, and to protect it also from internal pressure—such as that of the atmosphere—in case a vacuum should be formed within it, I construct a spiral, K, of any suitable metal, preferably a bar of iron of a thickness that will freely admit it into the valleys $d$ of the corrugations, and coil or otherwise place this re-enforcing bar tightly around and into these valleys, so that when they are in place, as shown in the figure, they practically fill the valleys with the inner surface, $e$, of the coil, and their outer surface, $f$, resting snugly within and against the inner surface of the mouth F of the pipe G. This re-enforcing coil K being of a much stronger material than that of which the sleeve A is constructed, it protects the sleeve from rupture by internal or external force.

As it will be necessary oftentimes to transport or ship sections of pipe with their ends connected and combined with the corrugated sleeve hereinbefore described, to prevent the disengagement or disconnection when fitted—as, for instance, at the factory—the entering pipe E may have cast upon it a flange or lugs, L, through which pass screw-bolts $g$, these screw-bolts being screwed into a ring, $h$, loosely fitting on the pipe E and adjacent to and connected with the ring D, before named. On these screw-bolts L are placed nuts $k$ and $l$, so that when these nuts are tightly screwed against the ring or lugs L it will be impossible to disturb either the pipes E or G or the sleeve A from the positions which they are intended to occupy when the pipes are finally put in place. When the pipes are in place, these screw-bolts L, or the nuts thereon, may be removed, permitting the free expansion and contraction of the pipes before described; or they may be adjusted to limit the range of motion of the sleeve A, and thus prevent it from being overstrained. These screw-bolts may also be used and employed for another purpose—that is, by tightening the nuts on the bolts L a certain bending or initial tension may be given to the corrugations in the sleeve A.

Having now described my invention, what I claim as new, and desire to secure by Letters Patent, is—

1. An expansible joint for pipes, comprising an entering tube, E, and its attached ring C, a corrugated sleeve, A, attached to said ring, a ring, D, to which the other end of said sleeve is attached, the covering-mouth F, and the flanged screw-ring H, connected to the covering-mouth to hold the ring D in place, substantially as shown and described.

2. In an expansible joint for pipes and tubes, a sleeve of thin metal, made with two spiral corrugations of opposite pitch, substantially as shown and described, and for the purpose set forth.

3. The combination, with the sleeve A, of corrugated sheet metal, and the mouth F, of the spiral K, arranged in the valleys inside and outside the sleeves, with the faces $e$ of its coils bearing against said sleeve and the faces $f$ thereof bearing against the mouth, substantially as and for the purpose described.

4. In an expansible joint for pipes and tubes, the following elements in combination: an entering tube, E, and an inclosing-mouth, F, a corrugated sleeve, A, and screw-ring C, with one end of the sleeve A fixed thereon, a ring, D, with the other end of the sleeve secured thereto, and a screw-ring, H, lugs L, screw-bolts $g$, and nuts $k$ and $l$, all constructed and arranged in the manner and for the purpose shown and described.

H. W. BRINCKERHOFF.

Witnesses:
G. M. PLYMPTON,
JNO. N. BRUNS.